Sept. 14, 1943.　　M. H. ENGLISH ET AL　　2,329,343
ELECTRICAL DEVICE
Filed March 11, 1942

Myrle H. English
Roland R. Nydegger INVENTORS
BY Thos. A. Wilson
ATTORNEY

Patented Sept. 14, 1943

2,329,343

UNITED STATES PATENT OFFICE 2,329,343

ELECTRICAL DEVICE

Myrle Hardt English, Pompton Lakes, N. J., and Roland Roswell Nydegger, Wilmington, Del., assignors to E. I. du Pont de Nemours & Company, Wilmington, Del., a corporation of Delaware Application March 11, 1942, Serial No. 434,268

4 Claims. (Cl. 219—10)

The present invention relates to the art of electrical devices, and in particular to means for attaching filaments in conducting relationship therein.

This application is a continuation-in-part of our co-pending application Serial No. 303,570, filed November 9, 1939, now U. S. Patent No. 2,279,451, issued April 14, 1942.

Difficulties have been encountered in the electrical arts in the joining of fine filaments to larger conductors, as in lamp manufacture and the like, largely due to the frangibility of the filament.

The object of our invention is an improved method for securing together tightly both in a mechanical and an electrical sense, a fine conducting filament and a larger conducting element. A further object is the attachment of metallic lamp filaments to their supports or lead wires. Additional objects will be noted in the following:

We have found that the foregoing objects are accomplished by electrically welding the filament to the other conductor by including in the weld in addition to the conductors to be joined a separate and distinct metal conducting unit such as a small strip of metal sheeting. The metal strip may be wrapped around the filament and the whole electrically welded to the other conductor, or alternatively the filament may be sandwiched between the strip and the other conductor and welded.

The invention may be carried out as follows with respect to joining a filament to a leading wire: the leading wire is cleaned and placed in a welding jig. The metal strip of tin-iron sheeting $\frac{1}{32}$ inch wide is folded about the filament. The strip with filament folded within it is then placed on the leading wire and held down with an electric welding tip. An ordinary welding current is passed through the whole, securing together the elements to form a welded juncture which includes the post, the wire and the strip of metal sheeting.

Our invention may be understood more readily by referring to the accompanying drawing, which sets forth preferred embodiments of the same. Similar numerals refer to corresponding parts throughout the several figures thereof.

Figure 1:
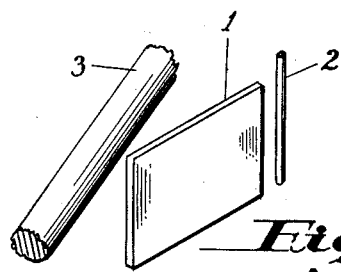
Figure 2:
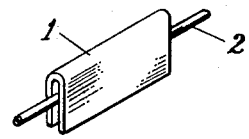
Figure 3:
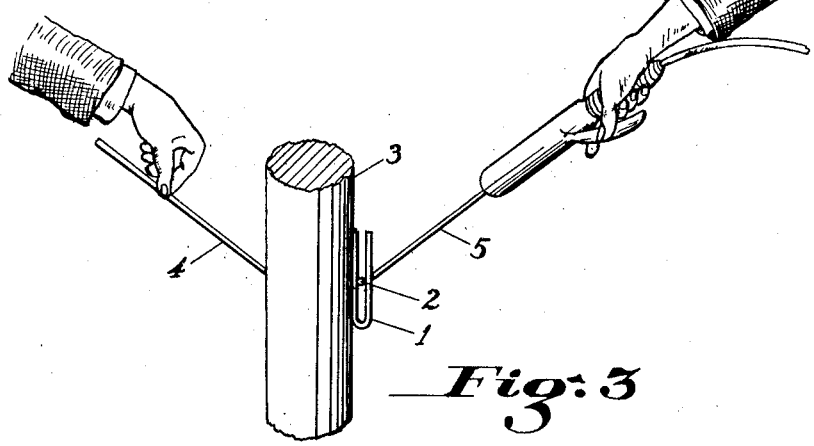
Figure 4:
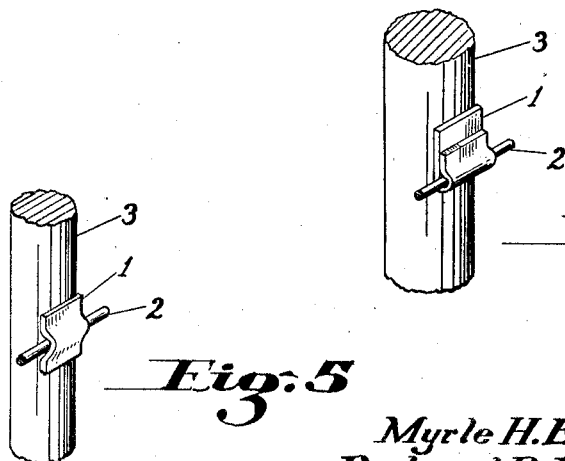
Figure 5:
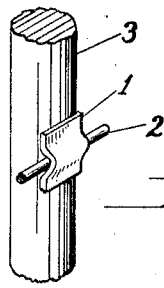

Figure 1 is a view of the parts to be welded. Figure 2 is a view of the metal strip folded about the filament. Figure 3 is a view of the assembly about to be welded. Figure 4 is a view of the completed juncture. Figure 5 is a view of a slightly different weld.

In greater detail, the metal strip 1 of Figure 1 is folded about the filament 2 as shown in Figure 2. This unit is welded to leading wire 3 using welding tips 4 and 5 as shown in Figure 3, to give the completed welded juncture as shown in Figure 4. In Figure 5 the weld has been completed without folding the strip 1 about filament 2, the latter being merely sandwiched between the strip 1 and conductor 3.

It is to be noted that the strip may be composed of a different metal from that of either the filament or the leading wire. For instance, with a copper leading wire an iron strip could be used.

While we have described our invention particularly with reference to the joining of a lamp filament to a leading wire, it should be understood that it is applicable as well to any problem wherein a small diameter high resistance wire is to be joined to another conductor, whether a lamp is involved, or a radio apparatus or any other electrical device.

The welding apparatus employed may be a conventional, mechanical spot-welding unit. The current regulation may be obtained with a conventional solenoid dash-pot type of timer which gives only approximately similar welding cycles. This is important only in so far as it indicates that the welding cycle is not a critical one as in most fine wire welding. It should be understood therefore that the success of the weld of our invention lies in its own structure and need not be associated in any way with specific types of welding equipment.

The method is advantageous because it can be adapted readily to mass production and mechanical assembly operations, and for the improved weld. The weld is characterized by increased electrical and mechanical durability and resistance to corrosion.

It is to be understood that while we have described our invention in the foregoing in detail, in connection with a specific embodiment thereof, we do not intend to be limited thereto. Our invention includes within its scope any variation thereof which would suggest itself to a skilled artisan. For instance, we have described in detail only copper-iron sandwiches; yet any metal-conducting sandwich may be employed. We intend to be limited therefore only by the following patent claims.

We claim:

1. The method of securing a metal filament having a diameter of the order of magnitude of a lamp filament to a larger metal conductor which comprises electrically welding together the filament, the conductor and a separate metal sheeting unit by disposing the filament between the conductor and a portion of the metal sheeting, placing said elements in contact with each other and passing an electric current serially through them.

2. The method of securing a metal filament having a diameter of the order of magnitude of a lamp filament to a larger metal conductor which comprises electrically forming a weld including the filament, the conductor and a unit of metal sheeting by disposing the filament between the conductor and a portion of the metal sheeting, placing said elements in contact with each other and passing an electric current serially through them.

3. The method of securing a metal filament having a diameter of the order of magnitude of a lamp filament to a larger metal conductor which comprises folding a strip of metal sheeting about the filament and electrically welding the whole to the conductor by passing an electric current serially through said elements placed in contact with each other.

4. In an electrical device, a connection between a metal filament having a diameter of the order of magnitude of a lamp filament and a larger metal conductor comprising an electrically welded juncture including the filament, the conductor and a unit of metal sheeting the filament being disposed between the conductor and a portion of the metal sheathing.

MYRLE HARDT ENGLISH.
ROLAND ROSWELL NYDEGGER.

CERTIFICATE OF CORRECTION.

Patent No. 2,329,343.  September 14, 1943.

MYRLE HARDT ENGLISH, ET AL.

It is hereby certified that error appears in the printed specification of the above numbered patent requiring correction as follows: Page 2, second column, line 15, claim 4, for "sheathing" read --sheeting--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.